July 15, 1924.
H. P. KRAFT
DUST CAP
Filed Sept. 20, 1919
1,501,350
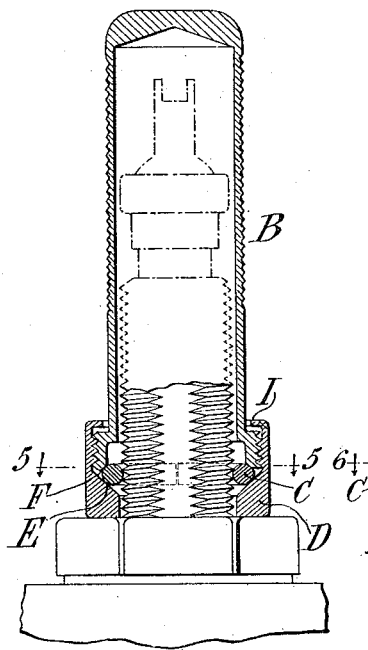
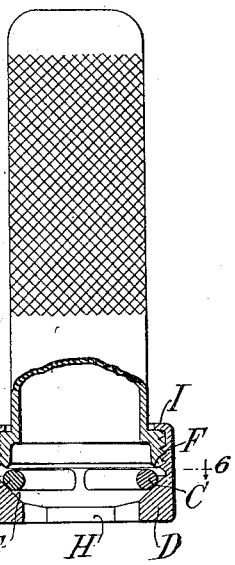
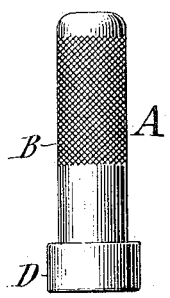
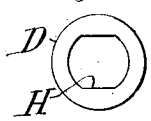
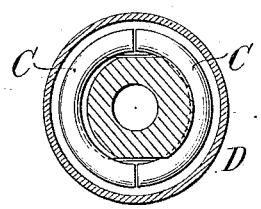
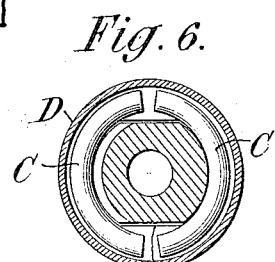
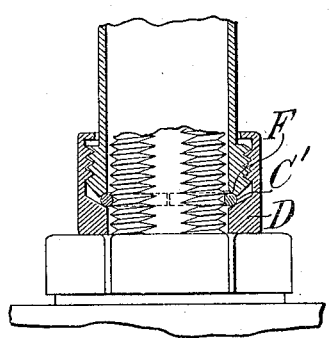
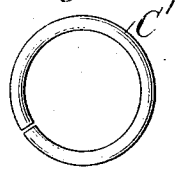
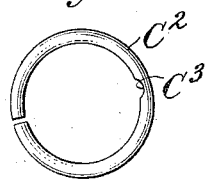
INVENTOR
Henry P. Kraft,
By Attorneys,
WITNESS Patented July 15, 1924.

1,501,350

UNITED STATES PATENT OFFICE.

HENRY P. KRAFT, OF RIDGEWOOD, NEW JERSEY, ASSIGNOR TO A. SCHRADER'S SON, INCORPORATED, OF BROOKLYN, NEW YORK, A CORPORATION OF NEW YORK.

DUST CAP.

Application filed September 20, 1919. Serial No. 325,097.

*To all whom it may concern:*

Be it known that I, HENRY P. KRAFT, a citizen of the United States of America, residing in Ridgewood, in the county of Bergen and State of New Jersey, have invented certain new and useful Improvements in Dust Caps, of which the following is a specification.

This invention relates to dust caps for tire valves and aims to provide certain improvements therein.

The device provided by the present invention is of what is known as the quick-detachable type of dust cap, that is to say, one that is adapted to slip along the projecting part of the tire valve and by a comparatively short movement be clamped in place. Similarly by a short reverse movement the dust cap is released.

According to the present invention the cap is provided with a clamping member which is detached therefrom, that is to say, which does not form a part of the cap, or is necessarily connected therewith. Preferably such clamping member comprises a ring-shaped portion which is capable of circumferential shortening. Such ring-shaped portion may be in one or more pieces, but preferably is in the form of a split ring. Means are provided for the circumferential shortening of the ring in order to clamp the cap to the tire valve, such means preferably comprising a foot portion which is threaded on the bottom of the cap portion, and which non-rotatably engages the valve.

Referring to the drawings which illustrate several forms of the invention,—

Figure 1 is an elevation of the cap complete;

Fig. 2 is a diametrical section of the cap;

Fig. 3 is an elevation partly in diametrical section;

Fig. 4 is a bottom view of the foot portion;

Fig. 5 is a sectional view on the line 5—5 in Fig. 2;

Fig. 6 is a sectional view on the line 6—6 in Fig. 3;

Fig. 7 is a diametrical section of the lower part of the cap showing a modification;

Fig. 8 is a plan of one form of clamp member;

Fig. 9 is a plan of another form of clamp member.

Referring to the drawings, let A indicate the cap as a whole, which comprises a cap portion B, clamp member C and foot portion D.

The cap may be of usual form or may be any other structure which is desired to clamp in place in a similar manner. It is shown as a conventional dust cap with a closed outer end and an open inner end, and having an internal diameter sufficient to enable it to slip bodily over the threads of the tire valve.

The clamp member C is of substantially ring-shape form and is adapted normally to slip over the tire valve, and when the dust cap is in position to be contracted circumferentially to engage the threads of the valve. In the preferred construction of the invention this circumferential shortening is accomplished by use of a foot member D which is threaded on the exterior of the lower part of the cap portion, the clamp member C being located between the two parts. It is preferable that the cap portion or foot portion shall be formed with a wedging face E of considerable breadth, and also preferable that the opposite portion shall also be formed with a wedging face such as F. As the cap portion is screwed down, the co-acting wedges circumferentially shorten the clamp member so that it engages the threads of the valve and securely holds the clamp in place. In order to assist in the tightening action and to provide a cap which requires only one hand to manipulate, the foot portion is preferably formed with flats H which engage the flats of the valve and hold the foot portion against rotation while the cap portion is being tightened or loosened.

In the construction shown in Figs. 2 to 6, the clamp member C is in the form of two semi-circular sections which readily move apart sufficiently to slip over the tire valve when the cap portion B is unscrewed slightly. Such sections, however, engage the threads tightly when the cap portion is screwed up.

In Figs. 7, 8 and 9, the clamp member is in the form of a split ring C' or C², it being found in practice that when the contracting face of the wedges is applied to the ring it will shorten longitudinally in the same manner as though it were formed in two sections.

It will be understood that the ring C' or C² is normally expanded so that it passes easily over the tire valve. In Fig. 9 a slight recess is provided by swaging or otherwise, as shown in C³, to facilitate the bending together of the sides of the ring. This, however, is not necessary since it is usually found that the ring contracts in true circular manner as the wedges act upon it.

In order to prevent complete separation of the foot and cap portions and to limit the movement of the clamp member, the foot portion is preferably provided with a flange turned over a shoulder on the cap portion, as indicated at I in Figs. 1 and 2.

It will be understood that the device provided by the present invention is not limited to dust caps but may be used in other connections and that while I have shown and described several forms of the invention, the latter may be changed in various ways without departing from the spirit of the invention as embodied in the claims.

What I claim is:—

1. In a dust cap for tire valves or the like, the combination of a cap portion, and means for fastening it to a valve or the like comprising a member formed of non-compressible material loosely associated with the cap, and means for contracting said member to engage the valve by a rotative movement of the cap.

2. In a dust cap for tire valves or the like, the combination of a cap portion, a foot portion, and a member formed of non-compressible material loosely associated with the cap, and means for contracting said member to engage a tire valve, said means operable by a relative rotary movement of the cap and foot portions.

3. In a dust cap for tire valves or the like, the combination of a cap portion, a foot portion, and a substantially circular member formed of non-compressible material loosely associated with the cap, and means for contracting said member to engage a tire valve, said means operable by a relative rotary movement of the cap and foot portions.

4. In a dust cap for tire valves or the like, the combination of a cap portion, a foot portion, and a ring loosely associated with the cap, and means for contracting said ring to engage a tire valve, said means operable by a relative rotary movement of the cap and foot portions.

5. A clamping device for dust caps or the like, comprising a substantially non-compressible ring-shaped member, and means for contracting it and releasing it to clamp and release an interior member, said means acting positively when contracting it.

6. A clamping device for dust caps or the like, comprising a substantially non-compressible ring shaped member, and means for contracting it and releasing it to clamp and release an interior member, said means comprising two members threaded together and rotative relatively to move them longitudinally and acting positively when contracting it.

7. In a dust cap for tire valves or the like, the combination of a cap portion and a foot portion, and a split ring arranged between the two and adapted to be contracted circumferentially to engage the tire valve by relative movements of such portions.

8. In a dust cap for tire valves or the like, the combination of a cap portion and a foot portion, one of which has a wedging face, and a split ring arranged between the two and adapted to be contracted circumferentially to engage the tire valve by being forced against said wedging face.

9. In a dust cap for tire valves or the like, the combination of a cap portion and a foot portion, provided with wedging faces, and a split ring formed of substantially non-compressible material arranged between said faces and adapted to be contracted by the same when they approach each other.

10. In a dust cap for tire valves or the like, the combination of a cap portion, and a foot portion, the cap portion screwing into the foot portion, and a split ring formed of substantially non-compressible material arranged between the two and adapted to be contracted when the cap portion is advanced into the foot portion.

11. In a dust cap for tire valves or the like, the combination of a cap portion, and a foot portion, the cap portion screwing into the foot portion, and a split ring arranged between the two and adapted to be contracted when the cap portion is advanced into the foot portion, and means for holding the foot portion against rotation on the valve.

12. A device adapted for clamping a part, comprising a ring-shaped member formed of non-compressible material and means for circumferentially shortening it, whereby to contract its diameter and positively force it inwardly to clamp such part.

13. A device adapted for clamping a part, comprising a split-ring and means for engaging the outer surface thereof to shorten the ring circumferentially whereby to positively press it into contact with such part whereby to clamp the same.

In witness whereof, I have hereunto signed my name.

HENRY P. KRAFT.